(12) United States Patent
Yao et al.

(10) Patent No.: US 10,936,913 B2
(45) Date of Patent: Mar. 2, 2021

(54) AUTOMATIC FILTER PRUNING TECHNIQUE FOR CONVOLUTIONAL NEURAL NETWORKS

(71) Applicants: THE REGENTS OF THE UNIVERSITY OF MICHIGAN, Ann Arbor, MI (US); DENSO International America, Inc., Southfield, MI (US)

(72) Inventors: Heming Yao, Ann Arbor, MI (US); Kayvan Najarian, Ann Arbor, MI (US); Jonathan Gryak, Ann Arbor, MI (US); Wei Zhang, Westland, MI (US)

(73) Assignees: THE REGENTS OF THE UNIVERSITY OF MICHIGAN, Ann Arbor, MI (US); DENSO International America, Inc., Southfield, MI (US)

( * ) Notice: Subject to any disclaimer, the term of this patent is extended or adjusted under 35 U.S.C. 154(b) by 97 days.

(21) Appl. No.: 16/357,778

(22) Filed: Mar. 19, 2019

(65) Prior Publication Data
US 2019/0294929 A1 Sep. 26, 2019

Related U.S. Application Data

(60) Provisional application No. 62/645,401, filed on Mar. 20, 2018.

(51) Int. Cl.
*G06K 9/00* (2006.01)
*G06K 9/62* (2006.01)
(Continued)

(52) U.S. Cl.
CPC ....... *G06K 9/6262* (2013.01); *G06K 9/00845* (2013.01); *G06N 3/04* (2013.01); *G06N 3/082* (2013.01)

(58) Field of Classification Search
CPC .. G06K 9/6262; G06K 9/0045; G06K 9/6271; G06K 9/00771; G06K 9/4628;
(Continued)

(56) References Cited

U.S. PATENT DOCUMENTS

2016/0321540 A1* 11/2016 Towal ................. G06K 9/4628
2017/0337467 A1* 11/2017 Kadav ................. G06K 9/4628
(Continued)

OTHER PUBLICATIONS

"Squeeze-and-Excitation Networks" J. Hu et al, arXiv:1709.01507 [cs.CV] (Sep. 5, 2017).
(Continued)

*Primary Examiner* — Jose L Couso
(74) *Attorney, Agent, or Firm* — Harness, Dickey & Pierce, P.L.C.

(57) ABSTRACT

An automated pruning technique is proposed for reducing the size of a convolutional neural network. A large-sized network is trained and then connections between layers are explored to remove redundant parameters. Specifically, a scaling neural subnetwork is connected to the neural network and designed to infer importance of the filters in the neural network during training of the neural network. Output from the scaling neural subnetwork can then be used to remove filters from the neural network, thereby reducing the size of the convolutional neural network.

16 Claims, 8 Drawing Sheets

(51) Int. Cl.
*G06N 3/04* (2006.01)
*G06N 3/08* (2006.01)

(58) Field of Classification Search
CPC ............ G06K 9/627; G06K 9/66; G06K 9/62;
G06K 9/00624; G06K 9/0063; G06K
9/00798; G06K 9/00805; G06K 9/6217;
G06K 9/6228; G06K 9/6288; G06K
9/6296; G06K 9/6254; G06K 9/6259;
G06K 9/626; G06K 7/1482; G06K
2009/00738; G06N 3/04; G06N 3/082;
G06N 3/0481; G06N 3/0454; G06N
3/084; G06N 3/0445; G06N 3/08; G06N
3/0427; G06N 3/049; G06N 5/04; G06N
5/045; G06N 5/046; G06F 16/901; G06F
17/15; G06F 17/153; G06F 17/156; G06F
17/17; H03H 222/04; G06T 3/4046;
G06T 9/002; G06T 2207/20081; G06T
2207/20084
See application file for complete search history.

(56) References Cited

U.S. PATENT DOCUMENTS

| 2017/0337471 | A1* | 11/2017 | Kadav | G06K 9/00771 |
| 2017/0337472 | A1* | 11/2017 | Durdanovic | G06N 3/0454 |
| 2018/0336425 | A1* | 11/2018 | Kadav | G06K 9/627 |
| 2018/0336431 | A1* | 11/2018 | Kadav | G06K 9/00624 |
| 2018/0336468 | A1* | 11/2018 | Kadav | G06K 9/6217 |
| 2019/0251442 | A1* | 8/2019 | Koivisto | G06N 3/082 |
| 2019/0286945 | A1* | 9/2019 | Kamath | G06N 3/082 |
| 2019/0362235 | A1* | 11/2019 | Xu | G06N 3/082 |
| 2019/0385059 | A1* | 12/2019 | Huang | G06N 3/082 |

OTHER PUBLICATIONS

"MSTN: Multi-Stage Spatial-Temporal Network for Driver Drowsiness Detection", T. Shih et al, ACCV 2016 Workshops, Part III, LNCS 10118 (2017).

* cited by examiner

AUTOMATIC FILTER PRUNING TECHNIQUE FOR CONVOLUTIONAL NEURAL NETWORKS

CROSS-REFERENCE TO RELATED APPLICATIONS

This application claims the benefit of U.S. Provisional Application No. 62/645,401, filed on Mar. 20, 2018. The entire disclosure of the above application is incorporated herein by reference.

FIELD

The present disclosure relates to an automatic filter pruning technique for convolutional neural networks.

BACKGROUND

Recently, convolutional neural networks (CNNs) have achieved extensive success in image recognition and segmentation. They are supervised models that can learn discriminative features automatically, often outperforming models using hand-crafted and knowledge-based features. In CNN, a larger network tends to have a high capacity to find the complex functions but at the cost of having highly redundant parameters. The filters, visual interpretation of weights, in the network often have similar patterns and some of them have noise rather than distinct features. The redundancy in CNN will impair the model generalization and accompanies unnecessary computation cost. The real-time application of deep learning techniques is often restricted by computation cost, memory storage and energy efficiency. The desktop system may have the luxury of burning 250 W of power for neural network computation, but embedded processors targeting automotive market must fit within a much smaller power and energy envelope. Therefore, a lightweight and computation-efficient system is important for real time applications.

Various methods are developed to simplify or compress the network. For efficient network design, depth-wise separable convolutions are proposed to introduce factorized convolutions and realize feed-forward acceleration. Group convolution and channel shuffle operation are also designed to improve the efficiency of CNN. Another different approach for obtaining a smaller network is to compress pertained network based on methods including low-rank tensor decomposition, product quantization, pruning, hashing, and Huffman coding.

In this disclosure, an automated pruning technique is proposed for reducing the size of a convolutional neural network. A large-sized network is trained and then connections between layers are explored to remove redundant parameters. Various studies have shown that the magnitude of the filter can indicate its importance. However, the conventional procedure for filter pruning involves pre-training, filter importance evaluation, filter pruning and fine-tuning, and different sets of hyper-parameters should be designed in each step. The criterion and threshold to classify filters as redundant filters is hard to decide and it may vary with the depth of layers.

Therefore, it is desirable to design a network that can be self-trained to estimate importance of filters in respective convolutional neural network and reduce the weights of redundant filters in the training phase. After the model training, the weights of redundant filters are minimized and a small-sized network can be built without accuracy loss by pruning those redundant filters.

This section provides background information related to the present disclosure which is not necessarily prior art.

SUMMARY

This section provides a general summary of the disclosure, and is not a comprehensive disclosure of its full scope or all of its features.

In one aspect, a computer-implemented method is presented for pruning a convolutional neural network, where the convolutional neural network includes a plurality of convolutional layers and each convolutional layer includes a plurality of neurons implemented in hardware. For at least one convolutional layer in the convolutional neural network, a scaling neural subnetwork is connected to the at least one convolutional layer, where an input layer of the scaling neural subnetwork is configured to receive weights of the filters in the at least one convolutional layer and an output layer of the scaling neural subnetwork outputs a scale vector. The elements of the scale vector quantify importance of filters in the at least one convolutional layer. The convolutional neural network is then trained, including the scaling neural subnetworks connected thereto. For the at least one convolutional layer in the convolutional neural network, filters from the convolutional layer are removed based on elements of a scale vector output by the respective scaling neural subnetwork, where filters are removed from the convolutional layer after training of the convolutional neural network.

In another aspect, a computer-implemented method is presented for pruning a convolutional neural network, where the convolutional neural network includes a plurality of convolutional layers and each convolutional layer includes a plurality of neurons implemented in hardware. A scaling neural subnetwork is configured to extract descriptors from filters of a convolutional layer of the convolutional neural network and infer importance of the filters. For at least one convolutional layer in the convolutional neural network, the scaling neural subnetwork is connected to the respective convolutional layer, where an input layer of the scaling neural subnetwork is configured to receive weights of the filters in the respective convolutional layer and an output layer of the scaling neural subnetwork outputs a scale vector, such that elements of the scale vector quantify importance of filters in the respective convolutional layer. The convolutional neural network, including the scaling neural subnetworks connected thereto, is then trained. Filters are removed from the at least one convolutional layer based on elements of a scale vector output by the respective scaling neural subnetwork, where filters are removed from the at least one convolutional layer after training of the convolutional neural network.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 3:
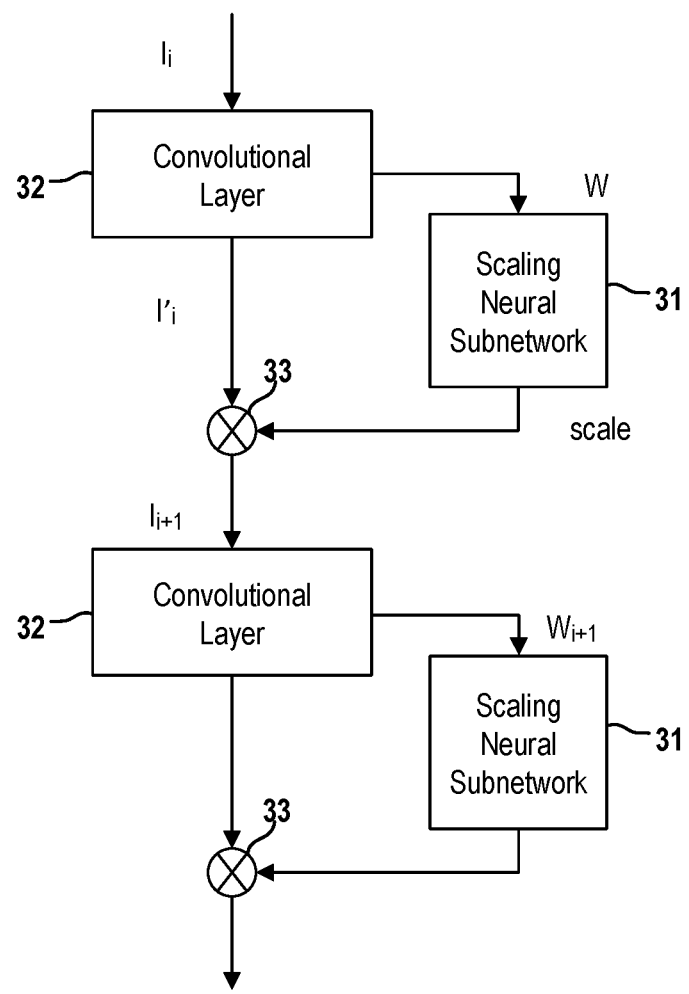
FIG. 3 is a diagram depicting of a portion of a convolutional neural network having scaling neural subnetworks connected to the convolutional layers.

To assist filter pruning, this disclosure introduces a scaling neural subnetwork 31 connected to at least one of the convolutional layers 32 in a convolutional neural network as seen in FIG. 3. The scaling neural subnetwork 31 is a subnetwork within the convolutional neural network. The scaling neural subnetwork 31 is designed to infer the importance of the filters in the convolutional layer. The input to the scaling subnetwork are weights of the filters in the respective convolutional layer. The output is a scale vector, where elements of the scale vector quantify importance of filters in the respective convolutional layer. The scale vector is in turn combined with the output from the respective convolutional layer as indicated at 33. During the training phase, the scaling neural network learns how to estimate filter importance by backpropagation and the inferred filter importance, i.e. the scale vector generated by the scaling neural network will be integrated into regular convolutional layers.

Figure 4:
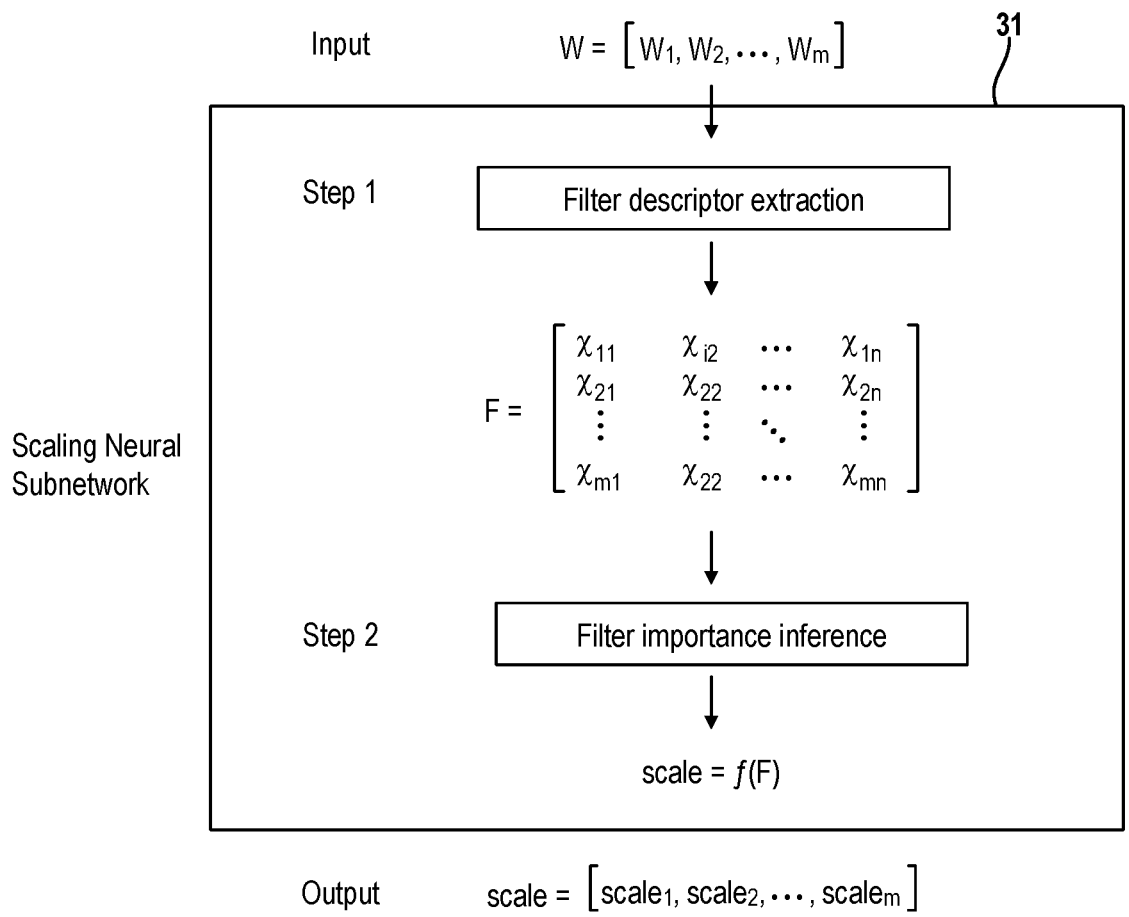
FIG. 4 is a diagram illustrating functionality of a scaling neural subnetwork.

With reference to FIG. 4, the input to a scaling neural subnetwork 31 are weights of m filters, where m is the number of filters in the corresponding convolutional neural network. For example, $W=[w_1, w_2, \ldots, w_m]$ is an input multidimensional array with a shape of m×depth×height×width×channel for a 3D convolution operation and a shape of m×height×width×channel for a 2D convolution operation. In the scaling neural subnetwork, firstly, a number of features/descriptors are extracted for each filter (step 1 in FIG. 4). In one example, the scaling subnetwork performs feature extraction on W, where n features are extracted for each filter, respectively and the feature vector for the ith filter can be denoted as $X_i=[x_{i1}, x_{i2}, \ldots, x_{im}]$. For example, the feature extraction in the scaling subnetwork can be performed by evaluating size of the filters in the respective convolutional layer. Additionally or alternatively, the feature extraction in the scaling subnetwork can be performed by evaluating similarity amongst filters in the respective convolutional layer. It is envisioned that other types of feature extractions are contemplated by this disclosure. F denotes the matrix where filter descriptors are stacked vertically.

Next, filter importance will be inferred based on F (step 2 in FIG. 4). Different embodiments for inferring filter importance are further described below. Structurally, the output from the feature extraction (step 1) in the subnetwork is fed into one or more hidden layers. In one embodiment, the subnetwork includes two fully connected hidden layers. In some embodiments, the hidden layers may not be fully connected. More or less hidden layers are also contemplated by this disclosure.

Filter importance are then output by the scaling neural subnetwork 31 as a scale vector. To do so, output from the hidden layers of the subnetwork is fed into an output layer of the scaling subnetwork which in turn outputs the scale vector. In one example, the output layer may be implemented by an activation function, preferably normalized from 0 to 1. The activation function can be further defined as a sigmoid function or a softmax function although other types of activation functions are contemplated by this disclosure. In any case, the output of the output layer is a scale vector, where elements of the scale vector quantify importance of filters in the respective convolutional layer.

Figure 5A:
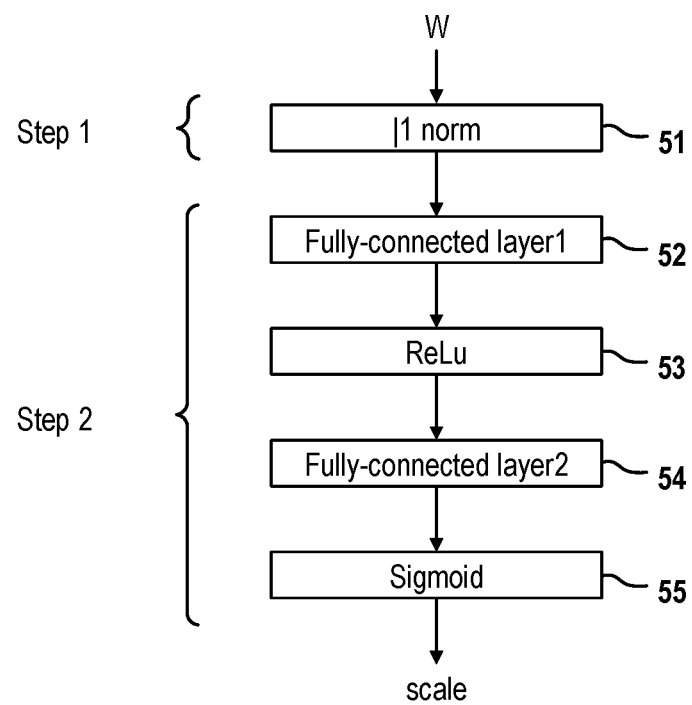
FIGS. 5A-5C are diagrams further illustrating example embodiments of a scaling neural subnetwork.
Figure 5B:
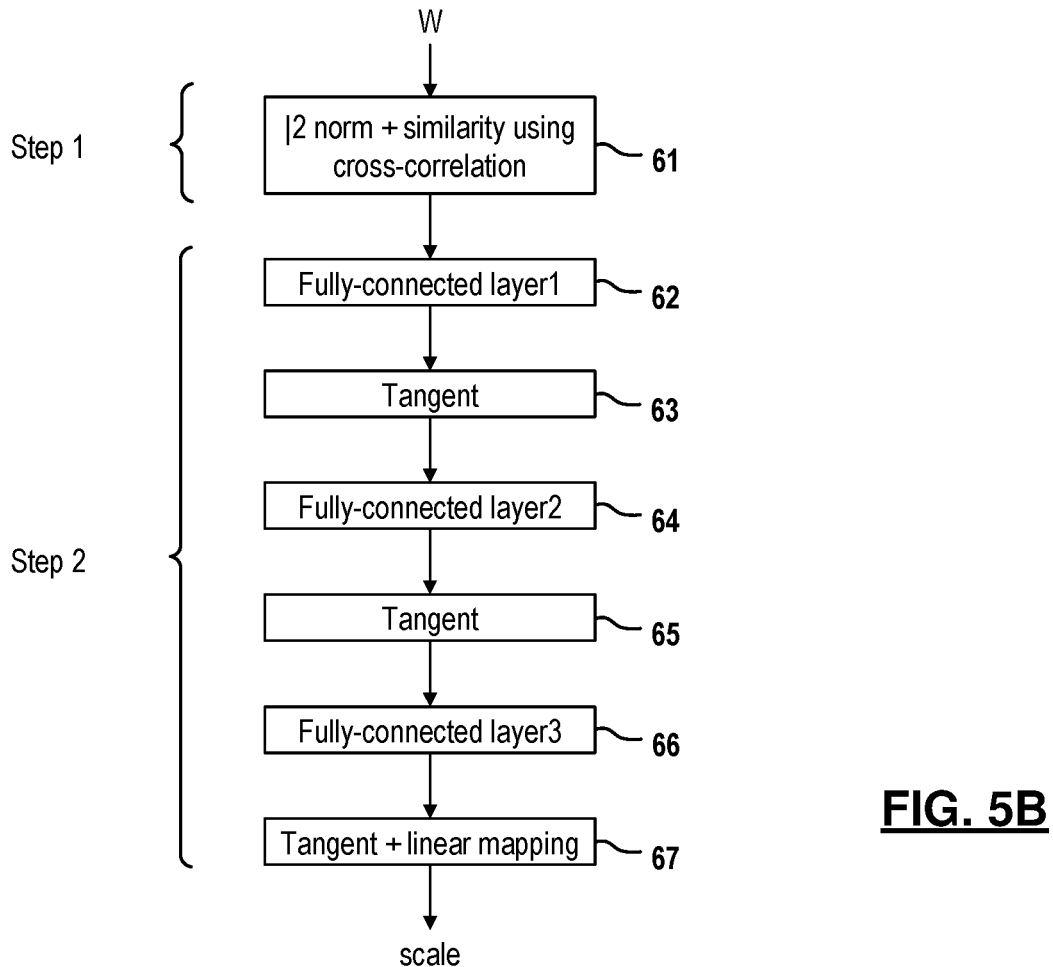
Figure 5C:
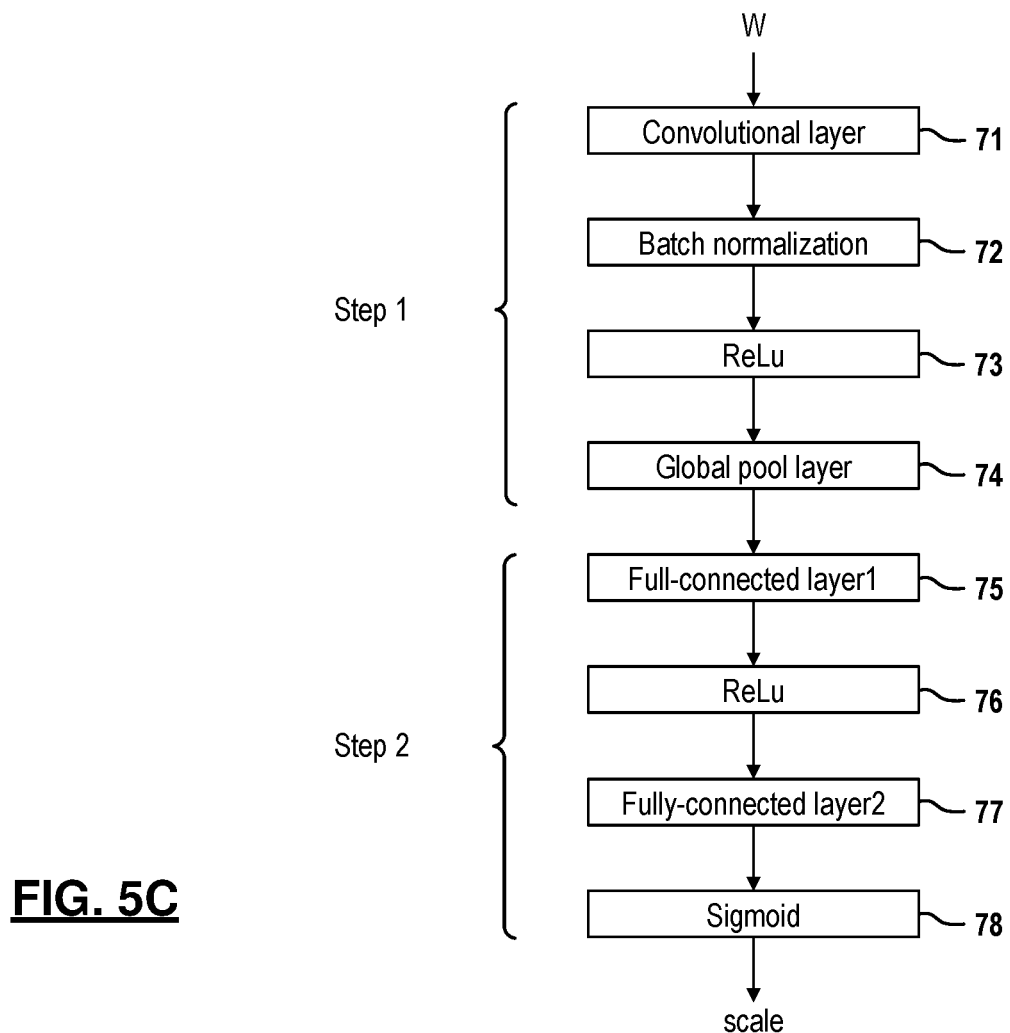

FIGS. 5A-5C illustrates example embodiments for the scaling neural subnetwork. In some embodiments, the scaling subnetwork is comprised of an input layer, one or more hidden layers and an output layer. Again, input to the scaling neural subnetwork is a collection of filter, $W=[w_1, w_2, \ldots, w_m]$. In FIG. 5A, the L1 norm of each filter weight is calculated, for example in an input layer as step 1. The output from the L1 norm operation 51 on the weights W is a vector of m, which can be written as $[\|vec(w_1)\|_1, \|vec(w_2)\|_1, \ldots, \|vec(w_m)\|_1]$, where $vec(w_1)$ is the function to turn the filter into a vector. While reference is made to L1 norm, other norms that favor sparsity are also contemplated by this disclosure.

Next, the output from step 1 goes through two consecutive fully connected hidden layers. In this example, the fully-connected layer 1 52 has $$\frac{m}{16}$$

neurons and the fully-connected layer 2 54 has m neurons. A rectified linear unit (ReLU) 53 may be interposed between the two hidden layers.

After these hidden layers, the scale vector is computed by an element-wise sigmoid function 55 over the output from the last fully connected layer. The output scale=$[scale_1, scale_2, \ldots scale_m]$ indicates the importance of each filter in one convolutional layer, where all elements are mapped between zero and one. In this example, the calculation of scale for the $i^t$ convolutional layer can be written as:

$$scale_i = S(w_2 R(w_1 f(W_i) + b_1)), \quad (3)$$

where S is the sigmoid function and R is the ReLU function, f is the $l_1$ norm performed on each filter in W, i is the index of the convolutional layer, $w_1$, $b_1$, $w_2$, $b_2$ are weights and biases of fc-1 and fc-2, respectively.

FIG. 5B depicts another example embodiment for the scaling neural subnetwork 31. The layer 61 extracts features for each filter using the L2 norm and by computing a cross correlation between pairs of filters in the respective convolutional layer. For filter importance inference (step 2), three fully-connected layers 62, 64, 66 and tangent activation functions 63, 65 67 are used. Outputs from the last tangent activation function is linearly mapped to [0,1].

FIG. 5C depicts yet another example embodiment for the scaling neural subnetwork 31. For filters of larger spatial sizes, regular convolutional layers and pooling layers can be used to extract features as step 1. In this embodiment, features are extracted by a series of four layers: a convolutional layer 71, a batch normalization layer 72, a rectified linear unit (ReLU) 73 and a pool layer 74. In step 2, the output from step 1 goes through another rectified linear unit (ReLU) 76 sandwiched between two consecutive fully connected hidden layers 75, 77. Finally, the scale vector is computed by sigmoid function 78. These three embodiments are merely illustrative and non-limiting example implementations for the scaling neural subnetwork 31.

Returning to FIG. 3, the scale vector generated from the scaling neural subnetwork 31 can be used to adjust the weights of filters in the respective convolutional layer 32. A general format of a regular convolution operation between $l_i$ and $j^t$, filter $w_j$ can be written as:

$$l_{temp,j}=l_i*w_j, \quad (4)$$

After introducing the scaling neural subnetwork, the output is calculated as:

$$l_{i+1,j}=\text{scale}_j l_{temp,j}, \quad (5)$$

From (4) and (5), the output from the extended convolutional layer can be written as:

$$l_{i+1,j}=l_i*\text{scale}_j w_j, \quad (6)$$

The design is proposed to automatically assign weights for filters in convolutional layers by the scaling neural subnetwork. From previous studies, the magnitude of filters can indicate their importance but the relationship may be too complex to be differentiated by a threshold. Using the designed neural network, one is able to extract filter features and approximate the function between the filter features and filter importance. It will also consider the dependence among the filters in the same layer. The sigmoid or softmax function acts as a 'gate' and will map the scale value to one for the most essential filters and to zero for redundant filters. The initiation value of $b_2$ are a vector of ones, thus before training, the initial scale values for all filters are about 0.73, i.e., R(1) if using sigmoid function in the output layer. In other words, all filters in the CNN have the similar scale values and they will keep being updated in the training phase. From (6), if $\text{scale}_j$ is close to zero, the effect of $w_j$ is diminished while if $\text{scale}_j$ is close to one, the effect of $w_j$ is fully kept. After the model is trained, filters with small scale values can be removed directly with little loss in the original accuracy. Different from previous filter pruning techniques, no fine tuning is needed after redundant filters are removed.

To facilitate the training process, the loss function of a CNN with J convolution layers is extended as:

$$\text{loss}=\text{loss}_{ori}+\gamma\Sigma_{j=1}^{J}\|\text{scale}_k\|_1, \quad (7)$$

where $\text{loss}_{ori}$ is the loss function of the regular CNN and loss is the loss function after a scaling neural subnetwork is introduced, $\text{scale}_j$ denotes the scale vector in the $j^t$ convolutional layer, $\gamma$ is a constant to control the power of filter pruning. Below the filter pruning performances under different values of $\gamma$ is evaluated and compared in one specific application.

Figure 6:
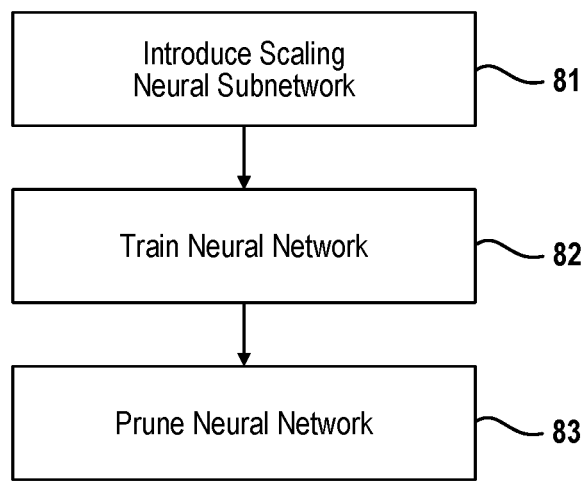
FIG. 6 is a flowcharting showing the proposed method for pruning a convolutional neural network.
Figure 7A:
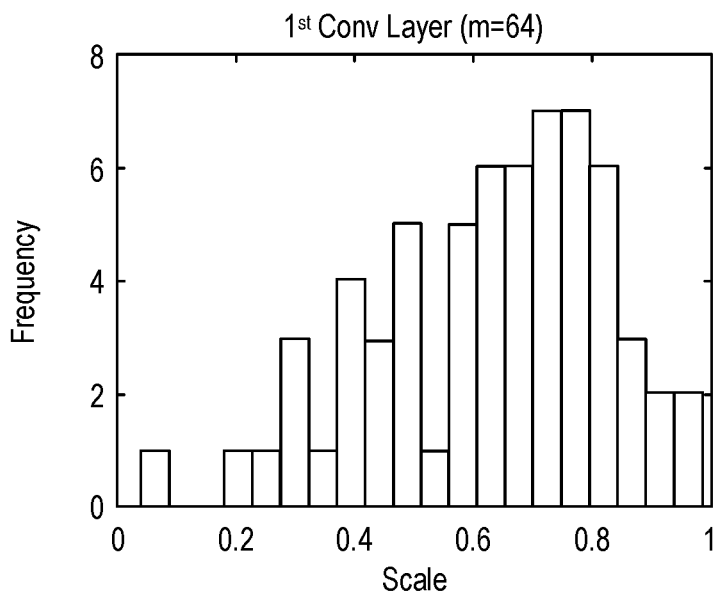
FIGS. 7A-7D are histograms of scale values for the first four convolutional layers of the example network.
Figure 7B:
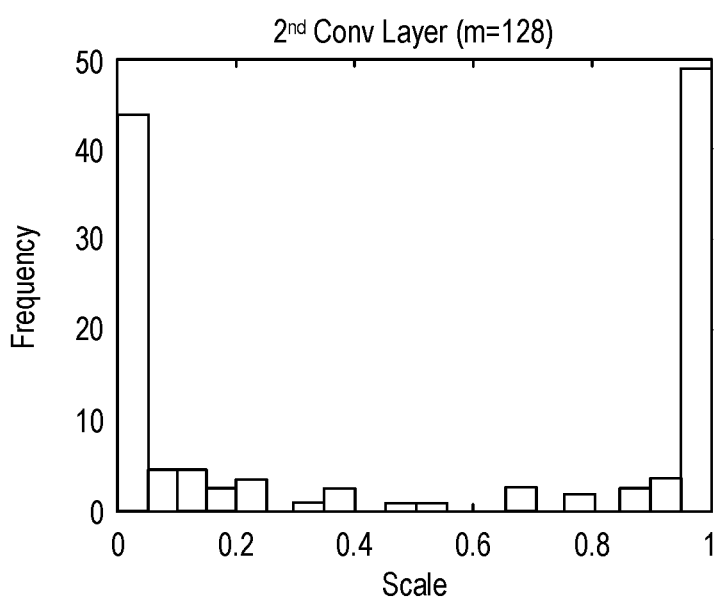
Figure 7C:
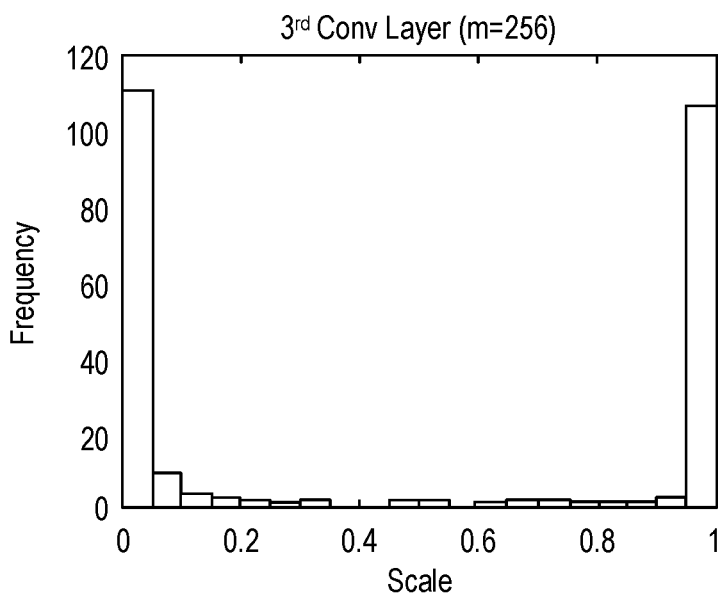
Figure 7D:
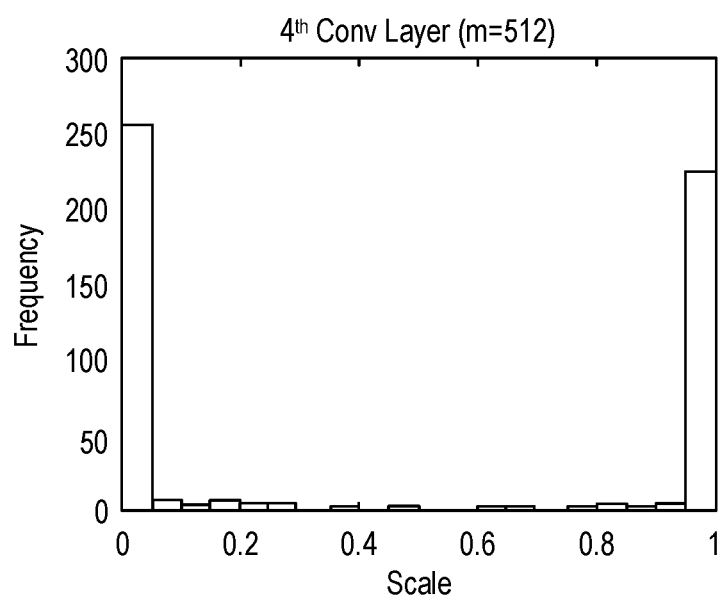

FIG. 6 shows a computer-implemented method for pruning a convolutional neural network in accordance with this disclosure. Before training, the convolutional neural network is configured at 81 with a scaling neural subnetwork connected to at least one convolutional layer and preferably a different scaling neural subnetwork connected to each respective convolutional layer. That is, a scaling subnetwork is connected to a respective convolutional layer, such that an input layer of the scaling neural network is configured to receive only the weights of the filters in the respective convolutional layer. The scaling neural subnetwork is designed to quantify importance of filters in the respective convolutional layer.

Next, the modified convolutional neural network is trained at 82, including the scaling neural subnetwork connected thereto. In one embodiment, the convolutional neural network is trained using a backpropagation method. Other training methods also fall within the scope of this disclosure.

The convolutional neural network is then pruned at 83 using the output from the scaling neural subnetwork. Filters are removed from the convolutional layer based on elements of a scale vector output by the respective scaling neural subnetwork. In one embodiment, a threshold method is employed. When the scale value corresponding to a particular filer is below a predefined threshold, the particular filter is removed from the respective convolutional layer; otherwise, the particular filter is left and the corresponding scale value is integrated into the filter as:

$$w_{j\_final}=\text{scale}_j w_j, \quad (8)$$

Below the distribution of scale values in each layer from one example is given, based on which the threshold can be conveniently decided.

Lastly, the scaling neural subnetworks are removed from the convolutional neural network. Now the trained neural network is ready for pattern recognition, for example in a drowsiness detection system. The pruned network has much fewer parameters and requires less computation cost.

One application for the pruning technique is further described. In this application, a visual-based drowsiness detection system analyzes videos and make predictions on human attention status (e.g., drowsy or not drowsy). A 3D convolutional neural network (CNN) was built for spatio-temporal feature extraction in consecutive frames, and filter pruning is used to decrease the computation cost.

Figure 1:
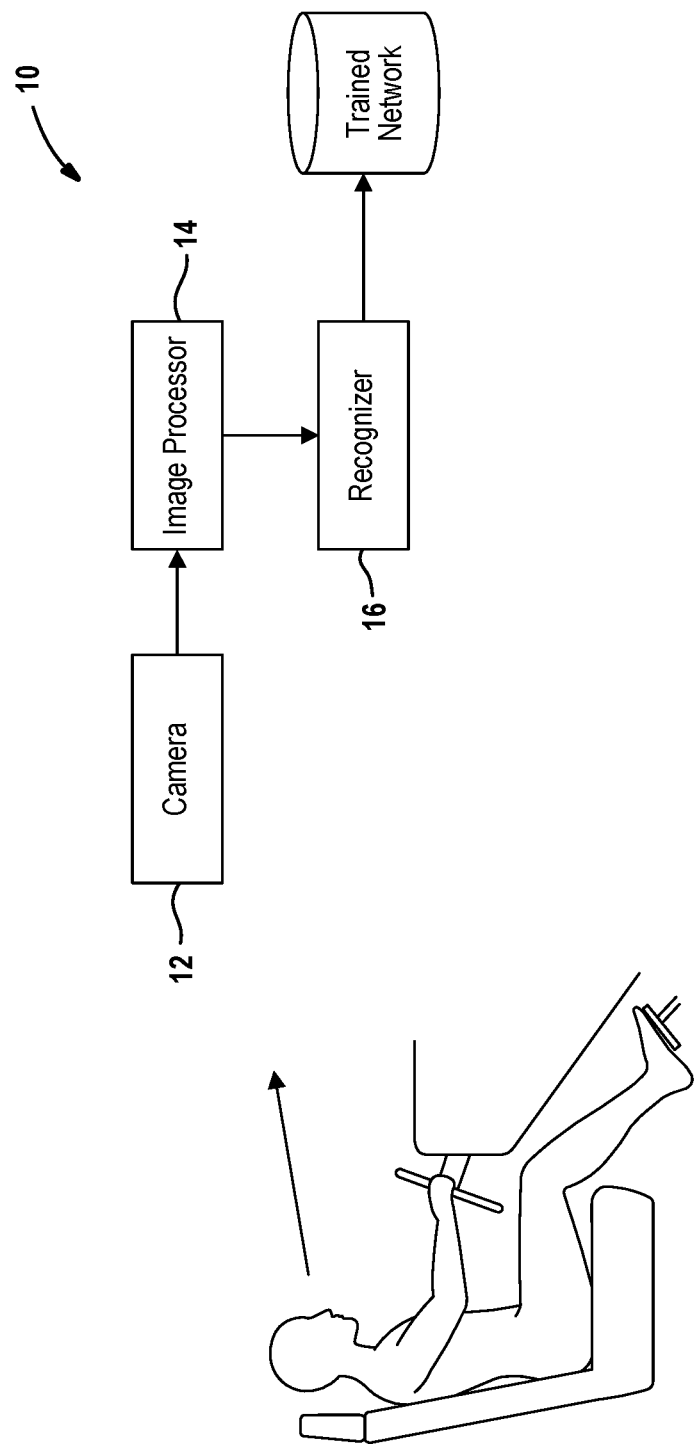
FIG. 1 is a diagram depicting a drowsiness detection system.

FIG. 1 depicts an example of a drowsiness detection system 10 integrated into a car. The drowsiness detection system 10 is comprised of a camera 12, an image processor 14, and a recognizer 16. The camera 12 is configured to capture images and/or video of a driver of the car. Image data from the camera 12 is passed along to the image processor 14. The image processor 14 extracts frames from the image data and the recognizer 16 computes a drowsiness score for the driver from the extracted frames. In one embodiment, the recognizer 16 uses a convolutional neural network to compute the drowsiness score as further described below. The drowsiness detection system 10 is further configured to implement protective measures if the drowsiness score exceeds a threshold. For example, the drowsiness detection system 10 may provide an alert to the driver or implement autonomous steering or braking operations.

Frames were extracted from each video and then the face regions were detected, for example using a pre-trained YOLO model. The face bounding box for each frame was extended to a square box to keep the original ratio of the face and then the cropped face regions were resized to 64×64. The input to the CNN consists of 10 consecutive frames with a step size of 10. These 10 frames are uniformly distributed in 10×10=100 frames and abstract the information in 100/30≈3.3 seconds when the fps is 30.

While the convolutional neural network is described in the context of an image recognition application (i.e., drowsiness detection system), this is merely an example application. It is understood that the pruning methods described herein are applicable to any application with a convolutional neural network. Particularly, the memory and computation redundancy can be very helpful for applications that are time-sensitive (e.g. real-time face recognition, semantic segmentation and object tracking for autonomous vehicle, voice/sound classification for environment understanding) and applications with substantial computation burden (e.g. volume segmentation using MRI/CT scans, tumor classification, and video-based emotion classification). In some instances, the pruning methods may be applicable to other types of neural networks as well.

Figure 2:
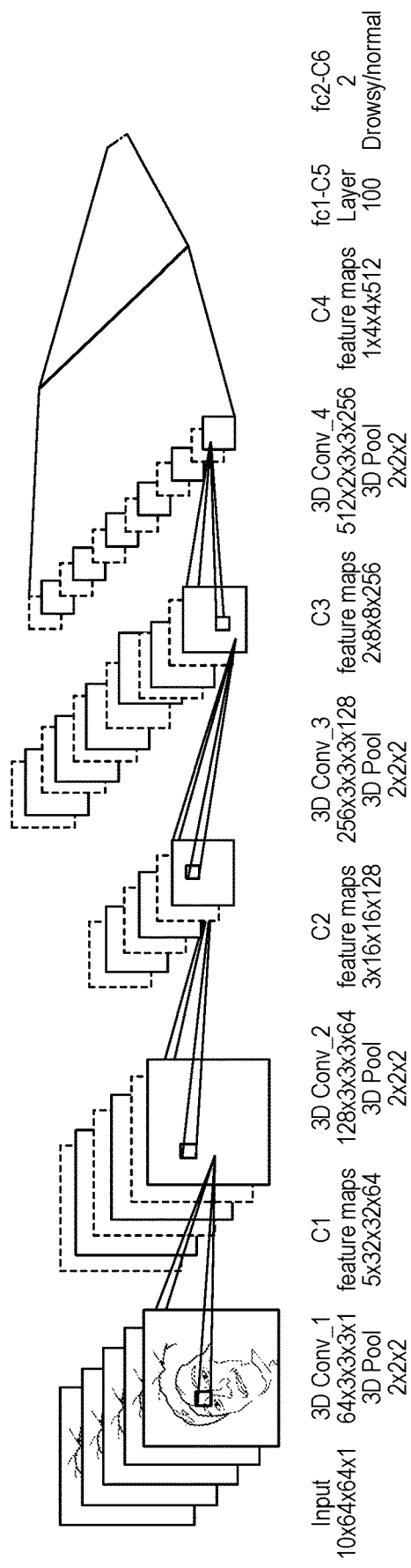
FIG. 2 is a diagram of an example 3D convolutional neural network architecture.

FIG. 2 illustrates the architecture for an example 3D convolutional neural network 20. The network consists of repetitive convolutional layers and max polling layers and two fully connected layers. The size of filters in each convolutional layer are given in the format of num_filters×depth×height×width×num_channels and the window size of max pooling layers are given in depth×height×width. Ci is used to denote the output from each unit. The shape of C1-C4 is depth×height×width×num_channels and the shape of C5-C4 is num_neurons. Thus, a 3D CNN was designed to capture the motion information from the sequential frames. While 2D kernel can only extract spatial features, 3D kernel has the potential to learn spatio-temporal features.

To assist filter pruning, the scaling neural subnetwork described in FIG. 5A is connected to each of the convolutional layers in FIG. 2. For each convolutional layer in the network, redundant filters with small scale values from the respective scaling neural subnetwork are removed from the network. Experimental results for the proposed pruning method in this application are discussed below. First, a 6-fold cross-validation was performed using the training set to evaluate the proposed filter pruning method under $\gamma=10^{-1}$, $10^{-2}$, $10^{-3}$, $10^{-4}$, respectively. In each fold, a 3D CNN model without the scaling neural subnetwork (Baseline) and a 3D CNN models integrated with the scaling neural subnetwork (Scaled Model) under different $\gamma$ values were built. All weights were initialized according to the Xavier scheme and biases were initialized with zeros except for the fc-2 in the scaling neural subnetwork described earlier. The Adam optimizer was used to minimize the loss with an initial learning rate of $10^{-4}$. The L2 weight decay regularization of $10^{-4}$ was used to improve the generalization ability of the model.

|  | Accuracy (%) | | | | | Parameter Reduction(%) | FLOP Reduction(%) |
| --- | --- | --- | --- | --- | --- | --- | --- |
|  | Scaled Model | Scale-Pruned Model | Baseline | $l_1$ norm-Pruned | Random-Pruned | | |
| $\gamma = 10^{-1}$ | 76.3 | 75.3 | 75.8 | 73.8 | 63.2 | 76.1 | 80.0 |
| $\gamma = 10^{-2}$ | 76.6 | 76.3 | 75.8 | 74 | 63.8 | 76.2 | 76.9 |
| $\gamma = 10^{-3}$ | 77.5 | 78.6 | 75.8 | 74.9 | 68.5 | 74.2 | 73.6 |
| $\gamma = 10^{-4}$ | 78.4 | 78.2 | 75.8 | 75.2 | 71.4 | 54.7 | 47.2 |

After the models were trained, filters with a scale value<0.5 were removed in Scaled Models (Pruned Scale Model) and for comparison, the same amounts of filters in each layer of the Baseline were removed randomly (Random Pruned Baseline) or directly based on the $l_1$ norm of the filters ($l_1$ norm Pruned Baseline) which is described in S. Han et al's "Learning both weights and connections for efficient neural network", Advances in neural information processing systems. 2015. The Random Pruned Baseline and $l_1$ norm Pruned Baseline were further fine-tuned with a learning rate of $10^{-8}$ while no fine tuning was performed for Pruned Scaled Model. The average accuracies and reductions in the number of parameters and flops after filter pruning were listed in Table 1 above. The results show that the accuracies of both Scaled Model and the Pruned Scaled Model decrease and the compression degree of Pruned Scaled Model increase with the increasing $\gamma$, i.e., the filter pruning power. Also, the average accuracies of Scaled Model are higher than those of Baseline with less than 1% increase of parameters from the Scaled Module. More importantly, Pruned Scaled Model, achieved an obvious better performance than Pruned Baseline.

FIGS. 7A-7D give examples on the distributions of scale values for filters in each convolutional layer. Notably, most of the elements in $scale_1$ stay around the initial value 0.73, while elements $scale_3$ and $scale_4$ are either close to zero or one. It indicates the filters in the $1^{st}$ layer tend to have similar importance, which is conformed with the finding in many publications that the first convolution layer in CNN extracts low-level features. At the same time, the distributions of scale values in the next three layers indicate the existence of redundant filters and the percent of redundant filters increases with the total number of filters in the convolutional layer. The threshold for filter pruning can be conveniently decided based on the distribution of scale values and as most of scale values are either close to 0 or 1, the choice of threshold have very limited effect on pruned model's performance.

TABLE II

F1 SCORE AND ACCURACY ON THE EVALUATION SET.
$\gamma = 10^{-3}$ WAS USED FOR THE SCALED MODEL

| Method | Drowsiness F1-score (%) | Nondrowsiness F1-score (%) | Accuracy (%) |
| --- | --- | --- | --- |
| Scaled Model | 76.46 | 73.15 | 75.02 |
| Scale-Pruned Model | 76.55 | 73.22 | 75.10 |
| Baseline | 74.55 | 72.02 | 73.53 |
| $l_1$ norm-Pruned | 73.26 | 70.56 | 72.21 |
| Random-Pruned | 66.84 | 63.75 | 65.79 |

Finally, based on the results, the 3D CNN integrated with the scaling neural subnetwork under $\gamma=10^{-3}$ was trained. After that, all filters with a scale value<0.50 are removed. The result shows that there is no loss in the accuracy after removal of 74.2% filters. Table 2 lists the average F1 scores and accuracies on another evaluation set.

Results show that the system can achieve a good performance and the scaling neural subnetwork can help one to compress the CNN efficiently and conveniently. The proposed scaling neural subnetwork and filter pruning framework can bring many advantages. The scaling neural subnetwork can model the relationship between the filter weights and filter importance in a specific layer and the gradient descent and backpropagation can be performed in the training phase to learn the function automatically. $l_1$ norm of scale is added as a term in the loss function and its coefficient $\gamma$ can be tuned to control the compression degree. The estimated filter importance will be integrated into regular convolution operation and increase/decrease the role of corresponding filter in the convolutional layer. In this way, redundant filters with a small scale value can be removed directly with tiny effect on the accuracy thus no further fine tuning is needed. Also, the scaling neural subnetwork can be easily adopted for any state-of-art CNN structures and combined with other network compression and techniques.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of further illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for pruning a convolutional neural network, the convolutional neural network includes a plurality of convolutional layers and each convolutional layer includes a plurality of neurons implemented in hardware, comprising:
   for at least one convolutional layer in the convolutional neural network, connecting a scaling neural subnetwork to the at least one convolutional layer, where an input layer of the scaling neural subnetwork is configured to receive weights of the filters in the at least one convolutional layer and an output layer of the scaling neural network outputs a scale vector, where elements of the scale vector quantify importance of filters in the at least one convolutional layer;
   training the convolutional neural network, including the scaling neural subnetworks connected thereto; and
   for the at least one convolutional layer in the convolutional neural network, removing filters from the convolutional layer based on elements of a scale vector output by the respective scaling neural network, where filters are removed from the convolutional layer after training of the convolutional neural network.

2. The method of claim 1 wherein the input layer of the scaling neural subnetwork evaluates size of the filters in the at least one convolutional layer by applying a norm.

3. The method of claim 2 wherein the input layer of the scaling neural subnetwork evaluates similarity amongst filters in the at least one convolutional layer.

4. The method of claim 3 wherein the input layer of the scaling neural subnetwork evaluates similarity amongst filters in the at least one convolutional layer by computing a cross-correlation between each pair of filters in the at least one convolutional layer.

5. The method of claim 4 wherein an output layer of the scaling neural subnetwork is an activation function.

6. The method of claim 1 wherein connecting a scaling neural subnetwork to the at least one convolutional layer further comprises combining the scale vector from the scaling neural network with output from the respective convolutional layer.

7. The method of claim 1 further comprises training the convolutional neural network using a backpropagation method.

8. The method of claim 1 wherein removing filters from the at least one convolutional layer further includes comparing elements of the scale vector to a threshold and removing filters corresponding to the elements whose value is less than the threshold.

9. A computer-implemented method for pruning a convolutional neural network, the convolutional neural network includes a plurality of convolutional layers and each convolutional layer includes a plurality of neurons implemented in hardware, comprising:
   configuring a scaling neural subnetwork to extract descriptors from filters of a convolutional layer of the convolutional neural network and infer importance of the filters;

for at least one convolutional layer in the convolutional neural network, connecting the scaling neural subnetwork to the respective convolutional layer, where an input layer of the scaling neural subnetwork is configured to receive weights of the filters in the respective convolutional layer and an output layer of the scaling neural subnetwork outputs a scale vector, such that elements of the scale vector quantify importance of filters in the respective convolutional layer;

training the convolutional neural network, including the scaling neural subnetworks connected thereto; and removing filters from the at least one convolutional layer based on elements of a scale vector output by the respective scaling neural subnetwork, where filters are removed from the at least one convolutional layer after training of the convolutional neural network.

10. The method of claim 9 wherein the scaling neural subnetwork extracts descriptors from filters of a convolutional layer by applying a norm to weights of the filters.

11. The method of claim 9 wherein the scaling neural subnetwork extracts descriptors from filters of a convolutional layer by determining similarity amongst filters in the respective convolutional layer.

12. The method of claim 11 wherein the scaling neural subnetwork determines similarity amongst filters in the respective convolutional layer by computing a cross-correlation between each pair of filters in the respective convolutional layer.

13. The method of claim 9 wherein an output layer of the scaling neural subnetwork is an activation function.

14. The method of claim 9 wherein connecting a scaling neural subnetwork to the respective convolutional layer further comprises combining the scale vector from the scaling neural network with output from the respective convolutional layer.

15. The method of claim 9 further comprises training the convolutional neural network using a backpropagation method.

16. The method of claim 9 wherein removing filters from the convolutional layer further includes comparing elements of the scale vector to a threshold and removing filters corresponding to the elements whose value is less than the threshold.

* * * * *